(12) United States Patent
Altmann (10) Patent No.: US 7,144,528 B2
(45) Date of Patent: Dec. 5, 2006

(54) METHOD AND MOLD TO CONTROL OPTICAL DEVICE POLYMERIZATION

(75) Inventor: Griffith E. Altmann, Pittsford, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 106 days.

(21) Appl. No.: 10/839,495

(22) Filed: May 5, 2004

(65) Prior Publication Data

US 2004/0207105 A1  Oct. 21, 2004

Related U.S. Application Data

(63) Continuation of application No. 09/797,328, filed on Mar. 1, 2001, now Pat. No. 6,772,988.

(60) Provisional application No. 60/193,906, filed on Mar. 31, 2000.

(51) Int. Cl.
*B29D 11/00* (2006.01)

(52) U.S. Cl. .................. 264/1.36; 264/1.38; 425/808

(58) Field of Classification Search ............... 264/1.36, 264/1.38; 425/174.4, 808
See application file for complete search history.

(56) References Cited

U.S. PATENT DOCUMENTS

| | | | |
|---|---|---|---|
| 4,166,088 A | 8/1979 | Neefe | |
| 4,534,915 A | 8/1985 | Neefe | |
| 4,702,574 A | 10/1987 | Bawa | |
| 4,732,715 A | 3/1988 | Bawa | |
| 4,879,318 A | 11/1989 | Lipscomb | |
| 4,919,850 A | 4/1990 | Blum | |
| 4,988,274 A | 1/1991 | Kenmochi | |
| 5,070,215 A | 12/1991 | Bambury | |
| 5,135,685 A | 8/1992 | Masuhara | |
| 5,154,861 A | 10/1992 | McBrierty | |
| 5,158,717 A * | 10/1992 | Lai ............................ | 264/1.1 |
| 5,158,718 A * | 10/1992 | Thakrar et al. ............. | 264/1.36 |
| 5,269,867 A | 12/1993 | Arai | |
| 5,271,875 A | 12/1993 | Appleton | |
| 5,529,728 A | 6/1996 | Buazza | |
| 5,610,252 A | 3/1997 | Bambury | |
| 6,800,225 B1 * | 10/2004 | Hagmann et al. ........... | 264/1.36 |
| 2002/0000680 A1 | 1/2002 | Altmann et al. | |
| 2002/0003315 A1 | 1/2002 | Ayyagari | |

FOREIGN PATENT DOCUMENTS

| | | |
|---|---|---|
| JP | 07294846 | 11/1995 |
| JP | 08043960 | 2/1996 |
| JP | 10260378 | 3/1997 |

\* cited by examiner

*Primary Examiner*—Donald Heckenberg
(74) *Attorney, Agent, or Firm*—John E. Thomas (57) ABSTRACT

A method and mold assembly to control the polymerization of a cast optical device. The mold assembly includes at least one mold portion having a non-critical surface with fresnel or diffractive geometry. Alternately, a fresnel lens or diffractive lens may be placed at a predetermined distance from the mold.

16 Claims, 4 Drawing Sheets

METHOD AND MOLD TO CONTROL OPTICAL DEVICE POLYMERIZATION

CROSS-REFERENCE TO RELATED APPLICATIONS

This application claims priority of U.S. Provisional Ser. No. 60/193,906 which was filed Mar. 31, 2000, and is a continuation of U.S. Ser. No. 09/797,328 filed Mar. 1, 2001, now U.S. Pat. No. 6,772,988.

BACKGROUND OF THE INVENTION

The present invention is directed toward controlled curing of devices requiring optical cure. More specifically, the present invention provides a method for curing optical devices such that the devices undergo a more uniform polymerization, resulting in a reduction in defects such as dimpling and warpage in the cured device. In particular, the optical devices include ophthalmic lenses including contact lenses, intraocular lenses, spectacle lenses, corneal onlays and corneal inlays. More particularly, this method provides for a method to produce contact lenses having a controlled cure profile.

It is often desirable to direct-mold optical devices such as contact lenses and intraocular lenses, rather than form the lenses by machining operations. In general, molded lenses are formed by depositing a curable liquid such as a polymerizable monomer into a mold cavity, curing the liquid into a solid state, opening the mold cavity and removing the lens. In particular, the mold cavity may be formed by a mold assembly comprised of a posterior mold portion and an anterior mold portion, each having a lens-forming surface. When the posterior mold portion and anterior mold portion are mated, the lens-forming surface of the posterior mold portion and the lens-forming surface of the anterior mold portion form the lens-forming cavity. The non-lens-forming surfaces of both mold portions, herein referred to as non-critical surfaces, are generally molded to have a similar radius (or radii) of curvature as that of the lens-forming surfaces. While the lens-forming surfaces are of optical quality, each having a central optical zone and typically, at least one peripheral carrier zone, the only requirement of the non-critical surface generally is a smooth surface.

Polymerization is typically carried out by thermal means, irradiation or combinations thereof. Traditionally, conventional thermo-casting techniques require fairly long curing times and are used when the resultant object is thick. Rods from which rigid gas permeable lenses are lathed from or thicker lenses are often thermally cured. Curing of lenses by irradiation, in particular, ultraviolet (UV) irradiation, frequently offers shorter curing times. The monomer is poured into a transparent mold having a desired optical surface, and thereafter the UV energy irradiates the monomer through the transparent mold to cure the photosetting monomer.

A common material used as a mold material is polypropylene, which is disclosed in U.S. Pat. No. 5,271,875 (Appleton et al., assigned to Bausch & Lomb Incorporated, the entire contents herein incorporated by reference). The process disclosed in Appleton et al., may be used to produce lenses with predictable and repeatable characteristics.

The use of polypropylene may be desired with certain lens-forming materials. Other lens-forming materials, however, may cast just as well or better in other mold materials. As disclosed in U.S. Ser. No. 09/312,105 (Ruscio et al. and assigned to Bausch & Lomb Incorporated, the entire contents herein incorporated by reference), polyvinyl chloride absent any UV stabilizer provides a suitable material for the posterior mold.

While the irradiation of the optical device from the light source may be conducted in a uniform and parallel manner, the material chosen for the mold portions may affect the pathways of the light rays. For instance, some materials, such as thermoplastic crystalline polymers, may diffuse the radiation, causing a scattering of the light rays. Polypropylene is such a material. Other materials such as polyvinyl chloride and polystyrene are thermoplastic amorphous polymers, which permit an unhindered pathway for the light rays during curing.

The radiation may also be reflected off the surface of the glass or plastic mold materials. This may result in non-uniform distribution of light intensity over the lens-forming material.

This invention recognized that the non-critical surface of the posterior mold may act as an optical device, reflecting and/or refracting the radiation in a non-uniform pathway through the mold portion. In particular, the non-critical surface of the mold may refract the radiation from the optical source. This may lead to non-uniform curing rates of ultraviolet polymerizable materials including resins and monomers. As a result, since the curing is completed faster and more completely in a portion receiving a high radiation intensity (in this instance, the periphery portion of the lens) and slower in a portion receiving a low radiation intensity (the central portion), stress is generated in the cured resin or monomer layer. This stress may deteriorate the precision of the optical device face. Additionally, the faster curable portion receiving higher radiation intensity is cured with absorption of the surrounding uncured resin or monomer in order to compensate for the contraction of resin or monomer resulting from the curing process. As a result, the slower curable portion (which receives lower radiation intensity) may show defects such as shrinkage. In particular, in the case of contact lenses and spectacle lenses, this can produce lenses with unacceptable optical aberrations caused by uneven curing and stress. "Dimpling" or warpage of the contact lens is a common problem caused by uneven curing. In dimpling, the apex of the lens is flattened or slightly concave in shape. Warpage is generally seen as the inability of the edge of a lens to have continuous contact with the molding surface upon which it contacts. Other drawbacks seen with plastic spectacle lenses include "striations", which are caused by uneven curing and stress. Thermal gradients form in the gel-state, which produce convection lines ("striations") that become frozen in place and cannot be dispersed.

U.S. Pat. No. 4,166,088 (Neefe) discloses controlling the polymerization of cast optical (plastic or contact) lenses. The mold section on the bottom is a lens which focuses UV light to the center of the cavity. The bottom mold must have a thickness which corresponds to the focal length of the refractive surface so that the UV light rays converge at the center of the monomer being cured. Neefe also requires an aluminum reflector on the outer surface of the top mold to reflect light back through the monomer.

U.S. Pat. No. 4,534,915 (Neefe) discloses the use of a convex positive refractive power cylinder lens to provide a band of actinic light to a rotating lens monomer. The center of the spin cast lens receives the most radiation, the area adjacent to the center receives less while the periphery receives still less radiation. This allows for the outer portion of the spin cast lens to migrate inward as the lens shrinks during the curing process. A fresnel lens or a Maddox rod may also be used to provide the narrow high energy line of actinic light.

U.S. Pat. No. 4,879,318 (Lipscomb et al.) discloses the use of mold members formed from any suitable material that will permit UV light rays to pass through. To aid in the even distribution of the UV light, the surfaces of the molds are frosted. In one embodiment, a Pyrex glass plate is used to filter out UV light below a certain wavelength. Lipscomb et al. found that if incident UV light is not uniform throughout the lens, visible distortion pattern may appear in the finished lens. Lipscomb et al. solved this problem by including additives in the lens forming composition to reduce the distortions. The ophthalmic lenses are formed from plastic.

U.S. Pat. No. 4,919,850 (Blum et al.) discloses a method for making plastic lenses in which the liquid lens material is dispensed into the mold cavity and put into a heated bath for a partial thermal curing. After a period of time, the mold (while still in the liquid bath) is subjected to UV light for an additional period of time. The liquid bath disperses the UV light sufficiently to avoid stresses and other adverse effects on the lens ultimately formed that may be caused by uneven exposure to the UV light. The mold may also be rotated while in the bath or the bath may include an aerator to enhance the dispersion of the UV rays. By rotation of the mold and aeration of the bath, the surface of the mold is also kept free of any debris which may otherwise channel the UV light. Additionally, a reflective surface provided on the one of the molds forms may reflect UV light back through the lens material being cured.

U.S. Pat. No. 4,988,274 (Kenmochi) discloses irradiating the central portion of the mold cavity containing the lens-forming material to initiate a photocuring reaction. The area of the light, in the shape of a ring, is enlarged until the lighted area reaches the periphery of the lens-forming material. A variable power lens, including a fresnel lens, may be used to align the light. The lens-forming material in the center of the mold cavity is cured first which causes the lens-forming material around it to shrink. The shrunk volume of lens-forming material is supplemented with additional uncured lens-forming material. The variable power lens allows for adjustment of the ring-shaped light.

U.S. Pat. No. 5,135,685 (Masuhara et al.) discloses the use of a conveyor or other moving device to continuously move objects to be irradiated by a multiplicity of aligned sources of visible light. The movement of the irradiated objects may be linear or curved movement on the same plane or upward or downward movement.

U.S. Pat. No. 5,269,867 (Arai) discloses a method for producing glass lenses with a coating on one side. The coating is a resin layer that is cured with UV light. The resin is dropped onto a metal mold (with a reflective surface) and the glass lens placed on the resin. The resin is interposed between the lens and the metal mold. UV light is provided through the glass lens, curing the resin. A filter may be used to evenly distribute the UV light. Without the filter, the reflection of the metal mold and the glass lens result in non-uniform distribution of UV light and non-uniform curing speed. The center of the resin cures faster than the outer perimeter, causing defects such as shrinkage in the resin.

U.S. Pat. No. 5,529,728 (Buazza et al.,) discloses a method of curing a plastic eyeglass lens. The method comprises placing a liquid polymerizable composition within a mold cavity defined by mold members and a gasket. A first set of UV rays are directed to one of the mold members. The gasket is removed and a second set of UV rays is directed to the lens. Buazza et al., further discloses the use of a filter which includes a plate of Pyrex glass to diffuse the UV light so that it has no sharp intensity discontinuities. To produce a positive lens, the UV light intensity is reduced at the edge portion so that the thicker center portion of the lens polymerizes faster than the thinner edge of the lens. Mold members of Buazza et al., are preferably precision ground glass optical surfaces having UV light transmission characteristics including casting surfaces with no surface aberrations, waves, scratches or other defects.

None of the above art completely solves the problems which occur when using a mold assembly in which one mold portion or both molds is made from an amorphous material and acts as an optical device. The resultant lens made from this particular mold assembly may have defects such as dimpling and warpage.

SUMMARY OF THE INVENTION

The present invention is a method for photocuring cast articles such as ophthalmic lenses in which defects in the cured article are reduced. By altering the pathway by which radiation rays reach the article to be cured, defects can be reduced. By controlling the relative intensity of radiation upon a particular portion of lens-forming material, the rate of polymerization taking place at various portions of the lens can be controlled. While this method works well with crystalline materials, it is particularly suited for use with mold materials which are amorphous.

In this invention, the radiation path from a source is altered so as to obtain a desired cure profile across the mold cavity. Nearly any cured profile may be attained including non-axisymmetric profiles. This results in a desired cure gradient across the cast article. The radiation path may be altered in various ways, including the use of an optical element or an optical surface cut into the non-critical surface of the mold receiving radiation.

In the preferred embodiment, fresnel or diffractive surfaces may be used to alter the radiation pathway. In particular, the non-critical surface of a mold may have fresnel or diffractive geometry formed into it. The resultant geometry of the non-critical surface may allow the mold to act as a negative, positive or neutral lens.

Alternately, a fresnel or diffractive lens may be placed between the light source and the mold. The lens may be placed at a predetermined distance away from the mold. The lens will alter the path of radiation, preferably ultraviolet (UV) radiation, passing through the mold and increase the energy available to the cured article. As a result, the distribution of radiation or energy across the mold will have a desired profile, which may remove any residual stress induced during curing. The result is a cured article such as a contact lens having an acceptable apex in the central portion of the lens. The optical element allows control of the illumination intensity profile reaching various sections of the contact lens. Unwanted stress induced by uncontrolled intensity profiles can be corrected. In addition, stress can be introduced in specific amounts and locations throughout the cast article as desired.

The ophthalmic lenses formed from these methods are relatively free from defects such as dimpling and warpage.

DETAILED DESCRIPTION OF THE INVENTION

The present invention is useful for the method of photocuring cast articles such as ophthalmic lenses. While this invention may be used to produce any device produced by photocuring, preferred embodiments include the method of making intraocular and contact lenses.

Figure 1:
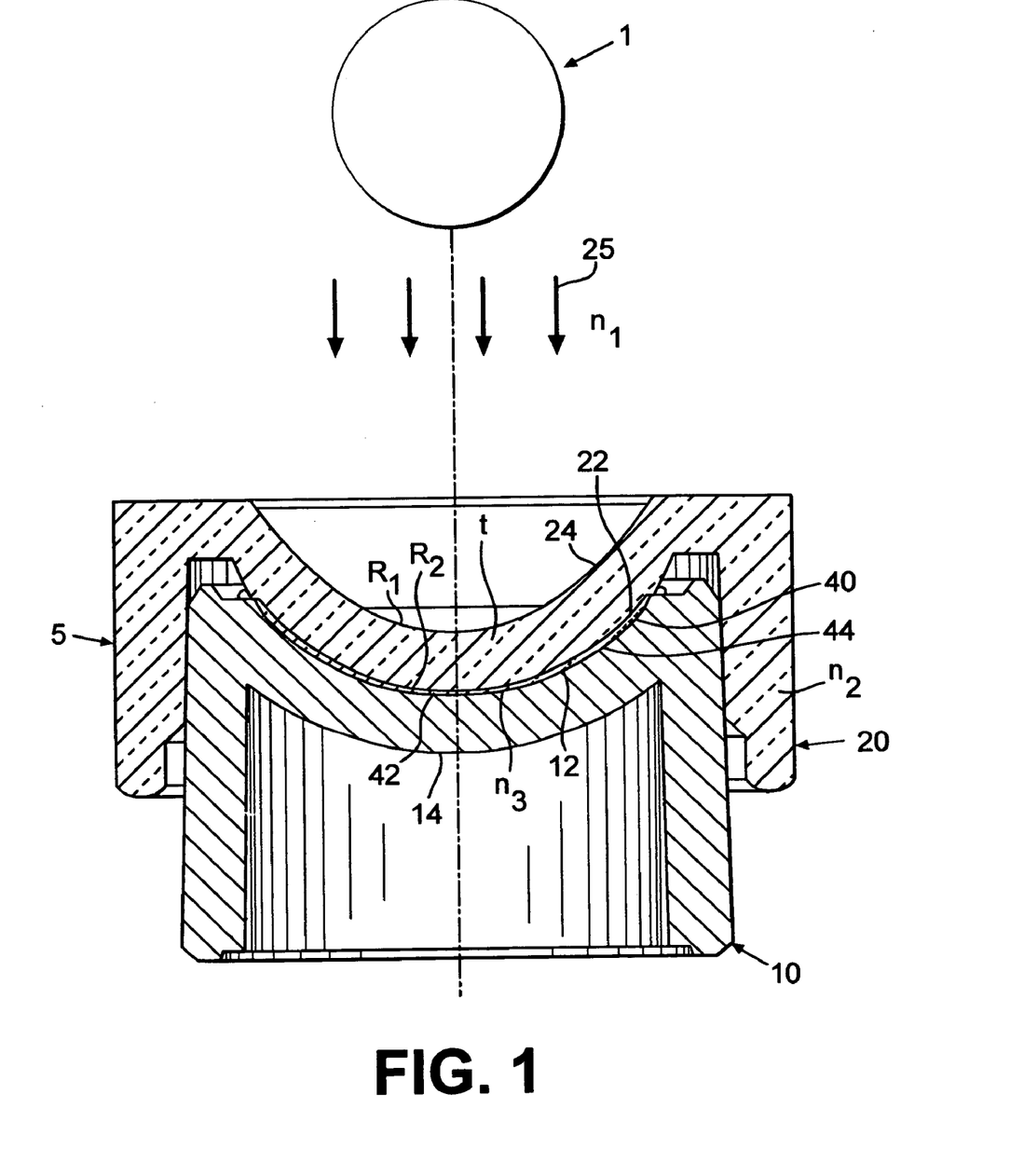
FIG. 1 is a cross-sectional elevational view of a posterior mold section assembled with an anterior mold section.
Figure 2:
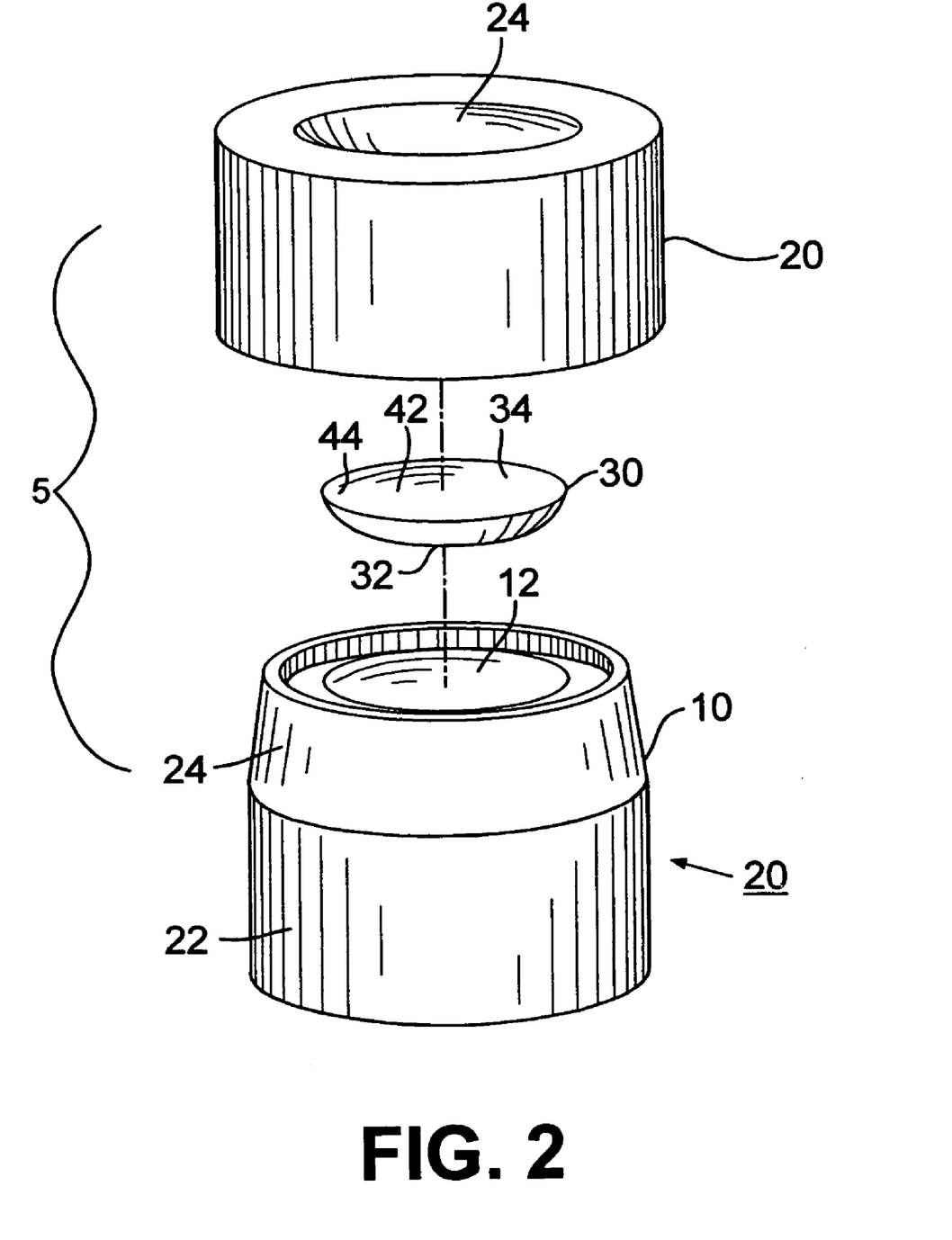
FIG. 2 is a perspective exploded view of a mold assembly including a contact lens.

As seen in FIGS. 1 and 2, mold assembly 5 defines mold cavity 40 for casting lens 30, including anterior mold portion 10 for defining the anterior lens surface 32 and posterior mold portion 20 for defining the posterior lens surface 34. Anterior mold 10 has lens-forming surface (critical surface) 12 and opposing non-critical surface 14. Posterior mold 20 has lens forming surface 22 and opposing non-critical surface 24. When posterior mold section 20 is assembled with an anterior mold section 10, lens-forming cavity 40 is formed between posterior mold section lens forming surface 22 and anterior mold section lens-forming surface 12. As discussed in Appleton et. al., lens 30 formed from this mold assembly include a central optical zone 42 and a peripheral carrier zone 44. The peripheral zone 44 has a substantially greater volume than the optical zone 42 and may include a tapered edge.

As illustrated in FIG. 1, rays 25 from optical source 1 irradiate non-critical surface 24 of posterior mold portion 20. The indices of refraction encountered by rays 25 change as the rays pass through air and then through a solid material.

The preferred materials for posterior mold portion 20 is an amorphous material such as polyvinyl chloride (PVC), polystyrene, an amorphous copolymer of ethylene and a cyclic olefin (such as a resin available under the tradename Topas from Hoechst Celanese Corporation) but may include crystalline thermoplastic materials as well (including polypropylene). Other suitable materials include inorganic standard glass, glasses available under the tradename Pyrex, borosilicates, polymethyl methacrylate, polycarbonate, acrylonitrile copolymer (such as resin available under the tradename of Barex), TPX (4-methyl 1-pentene) and polyacrylonitrile. Accordingly, it is preferred that anterior mold 10 is amorphous but other materials such as metals and crystalline thermoplastic materials may be used as well.

The optical or radiation source may be actinic, electron beam, laser or radioactive source, but is preferably ultraviolet lamps which irradiates the monomer. Visible light or infra-red light may also be used. Radiation may also be from a high intensity UV source. Additionally, combinations of light irradiation and thermal means may be used. Unless specified, the term "light" will refer to any actinic wavelength or range of wavelengths.

Posterior mold 20 can further be described by its optical parameters. In particular, based on the parameters of a posterior mold used to produce commercially available lenses but using an amorphous material such as PVC, one can calculate the powers of each surface of the mold: non-critical surface radius of −6.0 mm ($R_1$), critical surface radius of −8.0 mm ($R_2$), index of refraction of PVC mold material of 1.5 ($n_2$), index of refraction of air of 1.0 ($n_1$), center of thickness of the mold of 2.0 mm (t) and index of refraction of lens-forming monomer of 1.4 ($n_3$). While HEMA (2-hydroxyethylmethacrylate) is a preferred monomer, any lens-forming material may be used. Especially preferred are materials that are capable of free radical polymerization. Preferred materials include silicone and methacrylate hydrogels. Preferred examples of applicable materials are disclosed in U.S. Pat. Nos. 5,610,252 and 5,070,215 (Bambury et al., assigned to Bausch & Lomb Incorporated, the entire contents herewith incorporated by reference).

The posterior mold is a negative lens with essentially all of its negative power coming from the non-critical surface. The negative power of the mold causes incident UV rays to diverge as they pass through the mold which leads to a reduction in intensity at the center of the lens-forming cavity. The power of the posterior mold can be described by the following equations:

Power of non-critical surface 24 of posterior mold 20:

$$\phi_1 = (n_2 - n_1)/R_1 = -83.333 \ D$$

Power of critical (lens-forming) surface 22 of posterior mold 20:

$$\phi_2 = (n_3 - n_2)/R_2 = +12.5000 \ D$$

The total power ($\Phi$) of mold posterior:

$$\Phi = \phi_1 + \phi_2 - (t/n_2)\phi_1\phi_2 = -69.444 \ D$$

Figure 3:
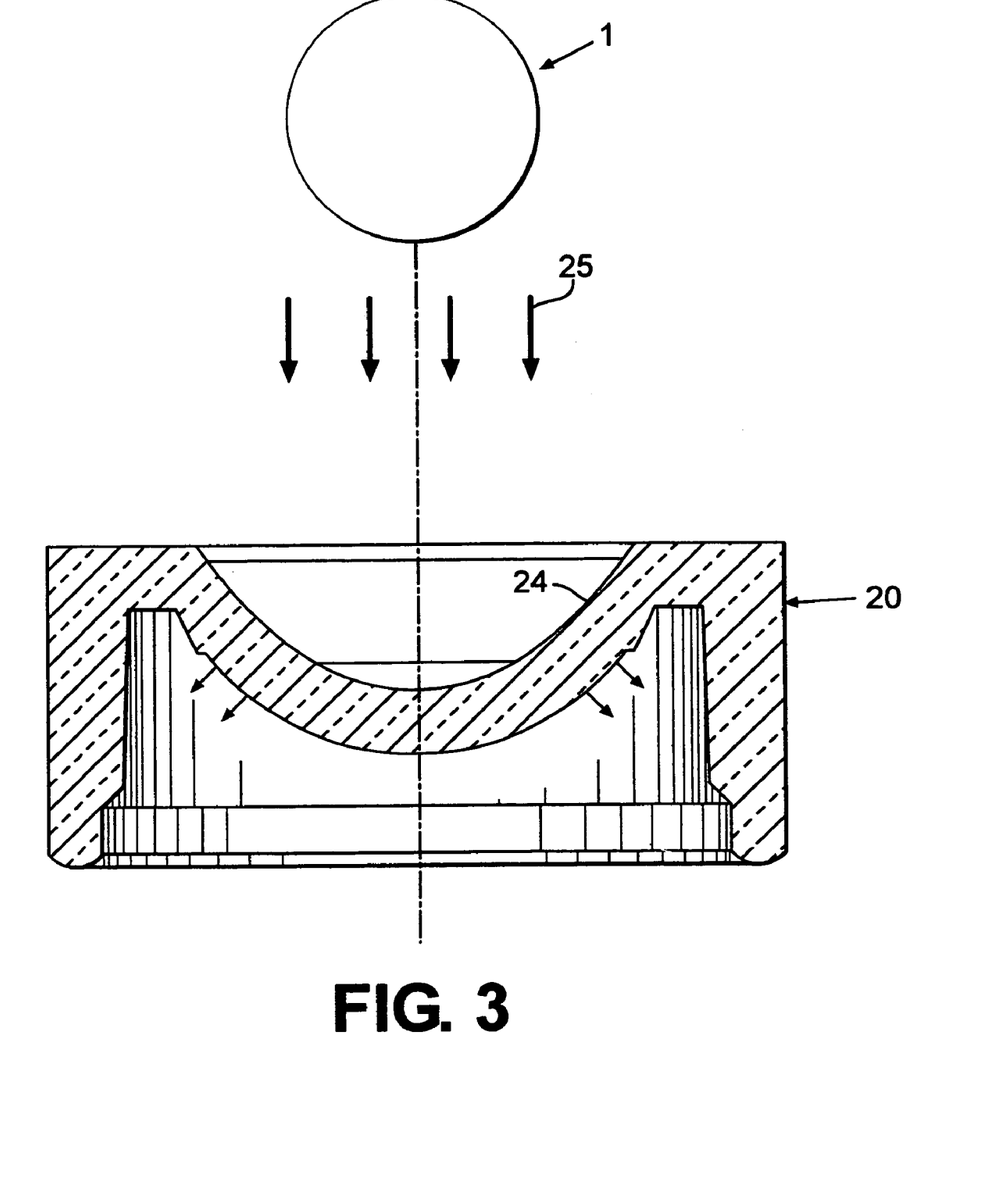
FIG. 3 is a cross-sectional elevational view of a posterior mold section showing light diffusion through the mold section.

Non-critical surface 24 of posterior mold 20 is typically spherical with a radius of curvature that is concentric with equivalent radii of lens-forming surface 22. This keeps the thickness relatively constant across the posterior mold. This concentric requirement forces posterior mold 20, especially when posterior mold 20 is an amorphous material, to be a substantially negative lens. As illustrated in FIG. 3, rays 25 passing through non-critical surface 24 of posterior mold 20 are refracted outward, away from the center optical portion (not shown) and toward the peripheral carrier zone of the lens (not shown) being cured.

A positive lens can be used to reduce the negative power of the mold. One embodiment of this invention may be the use of a lens with fresnel or diffractive components to direct radiation to a certain area. A fresnel lens or diffractive lens can be placed above the posterior mold. This would involve placing a lens at a predetermined distance from the posterior mold, thereby causing the light rays to converge toward the optical zone of the lens.

Figure 4:
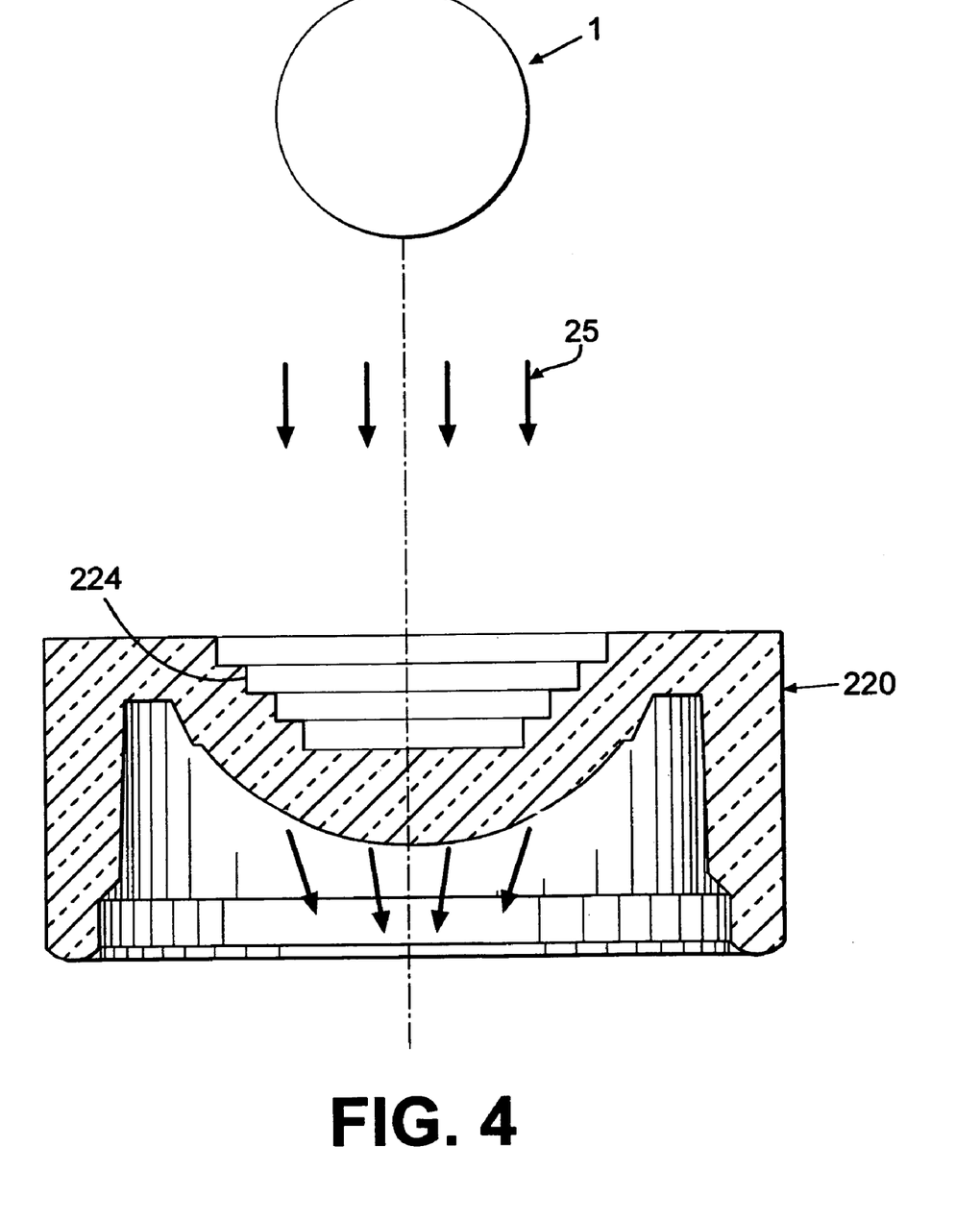
FIG. 4 is a cross-sectional elevational view showing light diffusion through a posterior mold section having fresnel geometry.

Alternately, a fresnel lens or diffractive lens may be incorporated into non-critical mold surface 224 of posterior mold 220 as shown in FIG. 4. In this manner, non-critical surface 224 can be altered such that the non-critical surface can achieve nearly any optical power profile. Thus, stress can be induced to any portion of the lens as desired. Non-critical surface 224 may be formed by laser or direct machining, compression/injection molding, etching or any other applicable method.

For example, non-critical surface 224 can be made to have zero optical power. This can be accomplished with "staircase" geometry as shown in FIG. 4.

Alternately, a fresnel or diffractive surface may be cut into the non-critical surface of the anterior mold. For instance, convex non-critical surface 14 of anterior mold 10 shown in FIG. 1 may have a fresnel or diffractive surface. This would be appropriate if the optical source irrradiated the anterior mold.

The power of a typical mold is calculated previously. It is shown that the powers of the non-critical and critical surfaces are −83.3 D and +12.5 D, respectively. By forming flat steps into the non-critical surface (i.e., the optical radius is now infinity), the power of the non-critical surface can be reduced to zero. In this case, the total power of the mold is +12.5 D. For example:

Power of non-critical surface:

$$\phi_1 = (n_2 - n_1)/R_1 = (1.5 - 1.0)/\text{infinity} = 0$$

Power of critical surface:

$$\phi_2 = (n_3 - n_2)/R_2 = (1.4 - 1.5)/(-0.008\ m) = +12.5000\ D$$

The total power ($\Phi$) of the mold is:

$$\Phi = \phi_1 + \phi_2 - (t/n_2)\phi_1\phi_2 = 0 + 12.5D - (0.002m/1.5)(0)(12.5D) = +12.5D$$

An advantage of incorporating a fresnel surface into the non-critical surface of the posterior mold is that the resulting mold would have approximately the same thickness profile throughout. In making high-precision molds by an injection molding process, it is generally preferred that the molds have a uniform thickness.

Another benefit of modifying the non-critical surface of the posterior mold, rather than using an external lens, is the posterior mold will accept a wider cone of radiation, thereby making it more efficient.

In an alternate embodiment, one may choose to introduce predetermined stress profiles into a lens, rather than remove them. In a specific instance, it may be desirable to form a lens having a specific shape which would alter the fitting of the lens to the eye, such as increasing the lens movement when worn on the eye. A specific parameter which could be stress-induced is edge lift which causes the edge of the lens to be slightly raised off the eye. Inducing stress to a lens can be performed by altering the parameters of the optical devices altering the radiation pathway.

The following example serves to illustrates the use of fresnel geometry incorporated into the non-critical surface of the posterior mold.

EXAMPLE 1

A series of HEMA lenses were cast according to conventional methods with the posterior mold portions prepared from an amorphous resin. Two sets of posterior mold portions had fresnel geometry cut into the non-critical surface with resulting hydrated lens powers of −6 D and −2 D. Two sets of posterior mold portions (also yielding hydrated lens powers of −2 D and −6 D) had controlled geometry (no junctions) and served as controls. After casting, the lenses were hydrated and parameters were measured.

TABLE 1

| Posterior Mold | SAG (mm) |
| --- | --- |
| -2D Control | 3.581 |
| -2D Fresnel | 3.581 |
| -6D Control | 3.382 |
| -6D Fresnel | 3.420 |

The −6 D lenses made with the control molds failed to meet sag requirements because of dimpling/warpage. The −6 D lenses made with the Fresnel molds met the sag specification and did not have dimples. Other lens parameter requirements, although not listed, were also met by the −6 D lenses made with the Fresnel molds.

I claim:

1. A method of casting an optical device within a mold assembly, said assembly comprised of first and second mold portions, said first mold portion having first and second opposing surfaces, said first surface having fresnol geometry and said second surface comprising an optical device-forming surface, said second mold portion having first and second opposing surfaces, said first surface comprising an optical device-forming surface, said method comprising the steps of:
    a) charging said first surface of said second mold portion with a polymerizable material;
    b) assembling said first and second mold portions such that said polymezitable material is sandwiched between said optical device-forming surface of said first mold portion and said first surface of said second mold portion; and
    c) irradiating said mold assembly such that said radiation path passes through said fresnel geometry of said first mold portion;
whereby said polymerizable material is cured to form an optical device.

2. The method of claim 1, wherein said optical device is a contact lens.

3. The method of claim 1, wherein said optical device is an intraocular lens.

4. The method of claim 1, wherein said polymerizable material is a methacrylate hydrogel.

5. The method of claim 1, wherein said polymerizable irLaterlal is a silicone hydrogel.

6. The method of claim 1, wherein said first mold portion comprises polyvinyl chloride.

7. The method of claim 1, wherein said first mold portion comprises polystyrene.

8. The method of claim 1, wherein said first mold portion is a posterior mold.

9. The method of claim 1, wherein said first surface of said first mold portion is concave.

10. The method of claim 1, wherein said first mold portion is an anterior mold.

11. The method of claim 1, wherein said first surface of said first mold portion is convex.

12. The method of claim 1, wherein said first surface of said first mold portion comprises a flat surface.

13. The method of claim 1, wherein said first mold portion is comprised of a crystalline material.

14. The method of claim 1, wherein said first mold portion is comprised of an amorphous material.

15. A method of casting an optical device within a mold assembly, said assembly comprised of first and second mold portions, said first mold portion having first and second opposing surfaces, said second surface of said first mold comprising an optical device-forming surface, said second mold having first and second opposing surfaces, said first surface of said second mold comprising an optical device-forming surface, said method comprising the steps of:
    a) charging said first surface of said second mold portion with a polymerizable material;
    b) assembling said maid portions such that said polymerizable material is sandwiched between said optical device-forming surface of said first mold portion and said first surface of said second mold portion;
    c) placing a diffractive lens at a predetermined distance from the first surface of said first mold portion; and d) irradiating said mold assembly such that said radiation path passes through said diffractive geometry of said lens;

whereby said polymerizable material is cured to form an optical device.

16. A method of casting an optical device within a mold assembly, said assembly comprised of first and second mold portions, said first mold portion Comprised of an amorphous material and having first and second opposing surfaces, said first surface comprising a surface with diffractive geometry and said second surface comprising an optical device-forming surface, said second mold having first and second opposing surfaces, said first surface comprising an optical device-forming surface, said method comprising the steps of:

a) charging said first surface of said second mold portion with a polymerizable material;

b) assembling said mold portions such that said polymerizable material is sandwiched between said optical device joining surface of said first mold portion and said first surface of said second mold portion; and c) irradiating said mold assembly such tat said radiation path passes through said diffractive geometry of said first mold portion;

whereby said polymerizable material is cured to form an optical device.

* * * * *

UNITED STATES PATENT AND TRADEMARK OFFICE
CERTIFICATE OF CORRECTION

PATENT NO. : 7,144,528 B2
APPLICATION NO. : 10/839495
DATED : December 5, 2006
INVENTOR(S) : Griffith E. Altmann It is certified that error appears in the above-identified patent and that said Letters Patent is hereby corrected as shown below:

Col. 8, line 7
 replace "fresnol"
 with --fresnel--.

Col. 8, line 16
 replace "polymezitable"
 with --polymerizable--.

Col. 8, line 32
 replace "irLaterlal"
 with --material--.

Col. 8, line 62
 replace "maid"
 with --mold--.

Col. 9, line 8
 replace "Comprised"
 with --comprised--.

Col. 10, line 6
 replace "device joining"
 with --device-forming--.

UNITED STATES PATENT AND TRADEMARK OFFICE
CERTIFICATE OF CORRECTION

PATENT NO. : 7,144,528 B2
APPLICATION NO. : 10/839495
DATED : December 5, 2006
INVENTOR(S) : Griffith E. Altmann It is certified that error appears in the above-identified patent and that said Letters Patent is hereby corrected as shown below:

Col. 10, line 8
  replace "tat"
  with --that--.

Signed and Sealed this

Eighth Day of May, 2007

JON W. DUDAS
*Director of the United States Patent and Trademark Office*